United States Patent

[11] 3,589,642

| [72] | Inventor | Leon Blagg |
| | | Bertram, Tex. |
| [21] | Appl. No. | 802,501 |
| [22] | Filed | Feb. 26, 1969 |
| [45] | Patented | June 29, 1971 |
| [73] | Assignee | Schlumberger Technology Corporation |
| | | New York, N.Y. |

[54] FLEET ANGLE CONTROLLER
14 Claims, 5 Drawing Figs.

| [52] | U.S. Cl. | 242/157.1, 254/190 |
| [51] | Int. Cl. | B65h 57/28 |
| [50] | Field of Search | 242/157.1, 157; 254/190 |

[56] References Cited

UNITED STATES PATENTS

| 782,103 | 2/1905 | Bruner | 242/157.1 |

FOREIGN PATENTS

| 1,016,031 | 8/1952 | France | 242/157.1 |
| 1,330,280 | 5/1963 | France | 242/157.1 |
| 892,791 | 10/1953 | Germany | 242/157.1 |
| 526,862 | 9/1940 | Great Britain | 242/157.1 |
| 261,465 | 8/1949 | Switzerland | 242/157.1 |

Primary Examiner—Stanley N Gilreath
Attorneys—Ernest R. Archambeau, Jr., William J. Beard, David Moseley, Edward M. Roney and William R. Sherman ABSTRACT: An illustrative embodiment of the present invention in apparatus for use in controlling the fleet angle of cable being spooled onto a drum includes first and second sheaves for routing the cable to the drum, said sheaves being mounted for pivotal movement about a pivot axis which is perpendicular to a plane containing the rotation axis of the drum, and means for mounting said sheaves in such a manner that forces due to cable tension pass through said pivot axis, whereby cable tension causes at least one of said sheaves and said pivot axis to lie in a common plane and the elevation of said one sheave with respect to said pivot axis to determined the fleet angle of the cable with respect to the drum.

Leon Blagg
INVENTOR

BY David L. Moseley

ATTORNEY

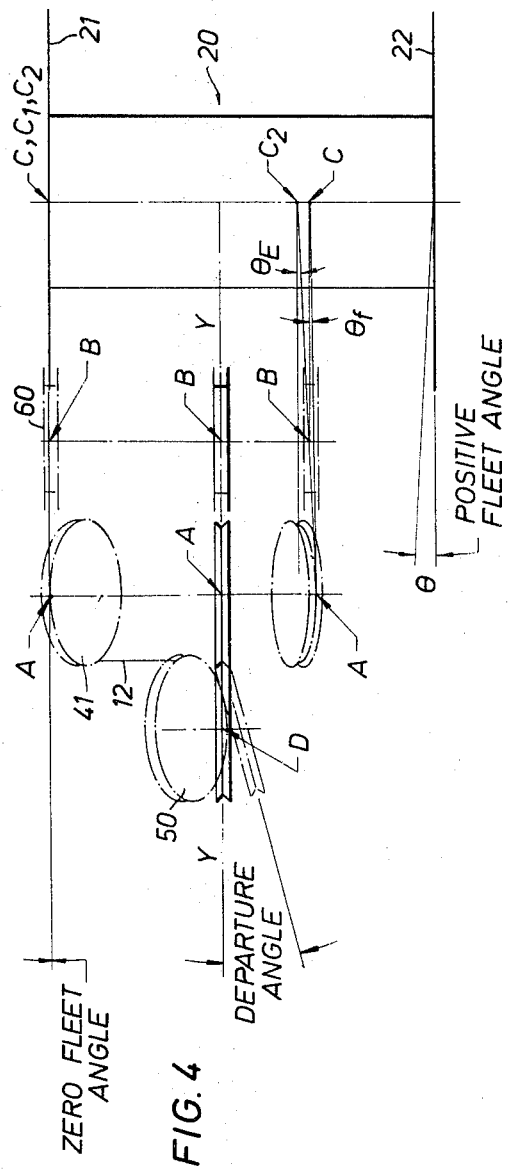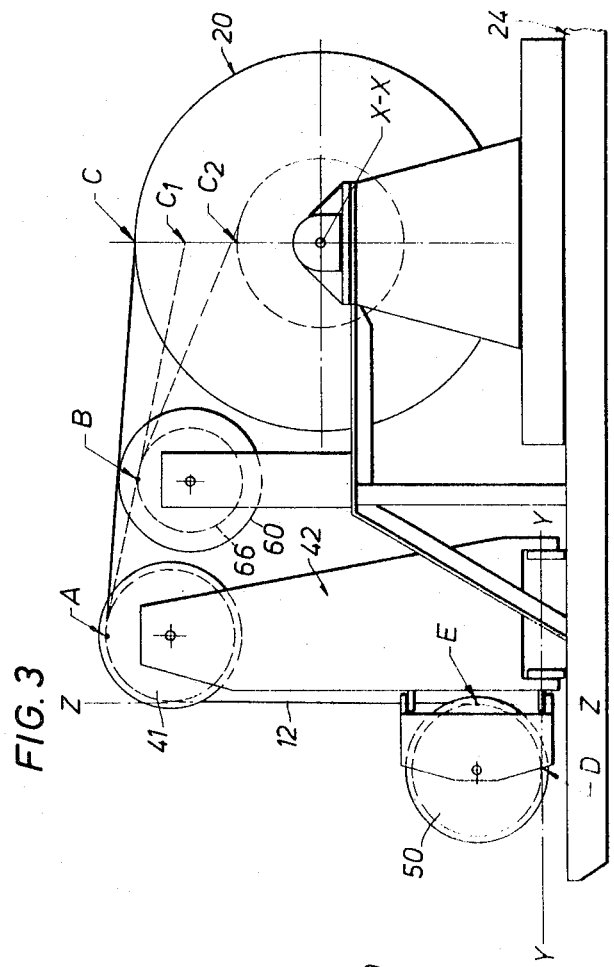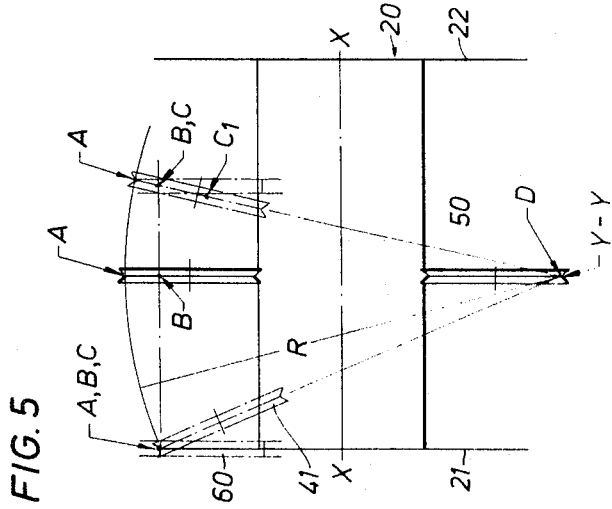

FLEET ANGLE CONTROLLER

This invention relates generally to cable spooling devices, and more particularly to a new and improved apparatus for spooling cable evenly and smoothly onto and off of a drum.

Various types of winch units and hoisting devices are used in connection with exploration activities such as well logging. In well logging, a measuring instrument or sonde is lowered and raised in a borehole to measure characteristic properties of earth formations traversed by the borehole. The winch unit used to move the sonde is located at the surface, usually on a logging truck, which also contains the various recorders and the like for making a permanent record of the measurements as a function of depth in the borehole. The sonde is supported on an electrical cable or wireline which is wound on the winch unit drum.

As the cable is reeled onto the drum, the cable will feed from side to side due to the guiding action of the recesses or grooves between preceding layers of cable on the drum, provided, however, that the angle which the cable approaches the drum is not excessive. This angle may be called the "fleet angle," and as used in this specification, the term fleet angle is used to define the angle formed between two vertical planes, one plane containing the cable and the other plane being perpendicular to the drum axis and extending through the point of first contact of the cable, coming in or leaving the drum, with previous layers of cable on the drum. The above-mentioned point of first contact will be called herein the "spooling point," whereas the nearest point from which the cable extends directly toward the drum will be called the "sheave point." Of course, if the sheave point is quite remote from the drum, the fleet angle will remain small, provided the drum axis is properly oriented with respect to sheave point. However, in so-called "short" hookups, where the drum is close to the logging sheave, one practical way to limit the fleet angle is to provide an auxiliary, oscillating sheave point in the immediate vicinity of the drum and which moves laterally or from side to side as the cable spools onto the drum. The lateral position of this sheave point with respect to the spooling point can then be controlled in order to provide a favorable fleet angle.

It will be appreciated that this transversely moving sheave point, during spooling action, can either lead the spooling point, in which case the fleet angle may be considered negative, or it may lag the spooling point, and provide a positive fleet angle. If the sheave point is directly in front of the spooling point, the aforementioned vertical planes coincide, and of course, the fleet angle is zero.

The value of the fleet angle is important to insure proper spooling action. If the fleet angle is too great in a negative sense, the cable may ride out of the groove between previous layers and jump one or more grooves. On the other hand, if the fleet angle is too great in a positive sense, the cable may wind back on itself. Additionally, if the fleet angle is either negative or zero at the drum flanges, the cable may wind up directly on top of the preceding layer and stack up. In all these cases, the result is a certain amount of scramble winding of the cable. This, of course, causes inefficiency and wear and tear on the cable, particularly when cable tension is high.

It is considered to be desirable to provide a negligible fleet angle while the cable is winding across the drum. However, when the cable reaches either side flange the fleet angle should be positive and of a magnitude of about 1¼° to insure smooth reversing of directions for the cable. Such tight control over the fleet angle has not heretofore been accomplished with a great degree of success. One prior system is shown in U.S. Pat. No. 3,083,932, Crowley et al., which discloses a sheave mounted for sliding motion along an oscillating axis of rotation. This system, however, is designed to provide a zero fleet angle at all times, which, is designed to provide a zero fleet angle at all times, which, as discussed above, is not ideal, particularly when the cable reaches either side flange and is forced to reverse spooling directions. Moreover, the use of an oscillating, transversely extending shaft causes problems both in manufacture and in mounting the assembly because it takes up a substantial amount of space near the drum.

The general object of the present invention is to provide a new and improved apparatus for evenly and smoothly reeling a cable or other flexible line onto a drum, the apparatus including a guide structure for routing the cable to the drum in such a manner that very accurate control is maintained over the fleet angle to insure proper spooling action.

This and other objects are attained in accordance with the principles of the present invention by a combination for use with a drum for storing cable of a sheave assembly mounted centrally of the end flanges of the drum for pivotal movement about an axis which is perpendicular to a vertical plane passing through the rotation axis of the drum. The assembly includes a first sheave which is tangent to the pivot axis, and a second sheave, the cable being routed around the sheaves and to the drum so that the forces due to cable tension pass through the pivot axis and produce no disturbing forces. Thus arranged, the sheave point on the second sheave, the spooling point at the drum, and the pivot axis all lie in a common plane, and the elevation of the sheave point will determine the fleet angle. Since the elevation of the spooling point changes with the level of cable on the drum between full and empty, a third sheave can be used to establish a minimum point of elevation for the cable between the sheave point and the drum, the third sheave functioning to compensate for changes in fleet angle due to changes in cable level on the drum. Moreover, when the cable reaches either side flange of the drum, means can be provided to limit pivotal movement of the sheave assembly to establish a precise fleet angle which insures proper reverse spooling. Further, the combination may include a counterbalancing structure for compromising the effects of off-center weight of the guide assembly during pivotal rotation.

The present invention has other objects and advantages which will become more clearly apparent in connection with the following detailed description of a preferred embodiment shown in the appended drawings in which.

FIGS. 3—5 are schematic side, top and end views showing the guide sheaves together with the drum and in various pivotal positions in order to illustrate the principles of the present invention.

Figure 1:
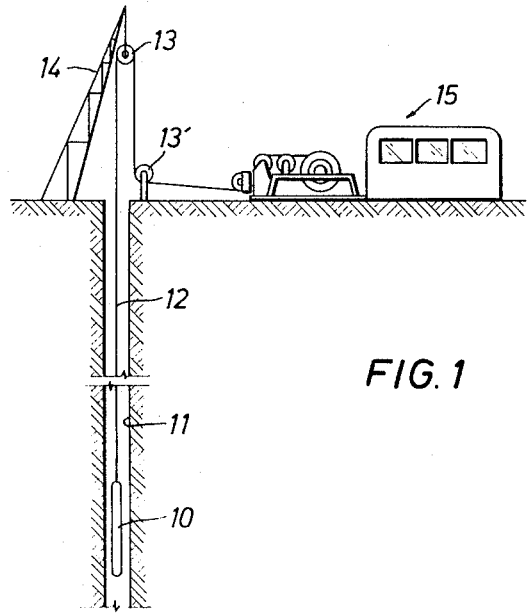
FIG. 1 is a schematic view of a winch unit in accordance with the present invention being used in connection with a well logging operation.

Referring initially to FIG. 1, a measuring instrument of sonde 10 is suspended in a borehole 11 on an electrical cable or wireline 12. The cable 12 passes over a logging sheave 13 hung from a mast 14 or the like, underneath a sheave wheel 13' and extends to a winch unit 15. The winch unit 15, used for raising and lowering the sonde 10 in the well bore, may constitute a part of a wheeled vehicle such as a logging truck, or may be mounted on skids for offshore logging operations. As shown, a winch unit 15 according to this invention can be located closely adjacent the borehole 11, the installation being a so-called short hookup. As will become more clearly apparent, the present invention has particular utility at wellsite conditions requiring short hookups or poor lineups.

Figure 2:
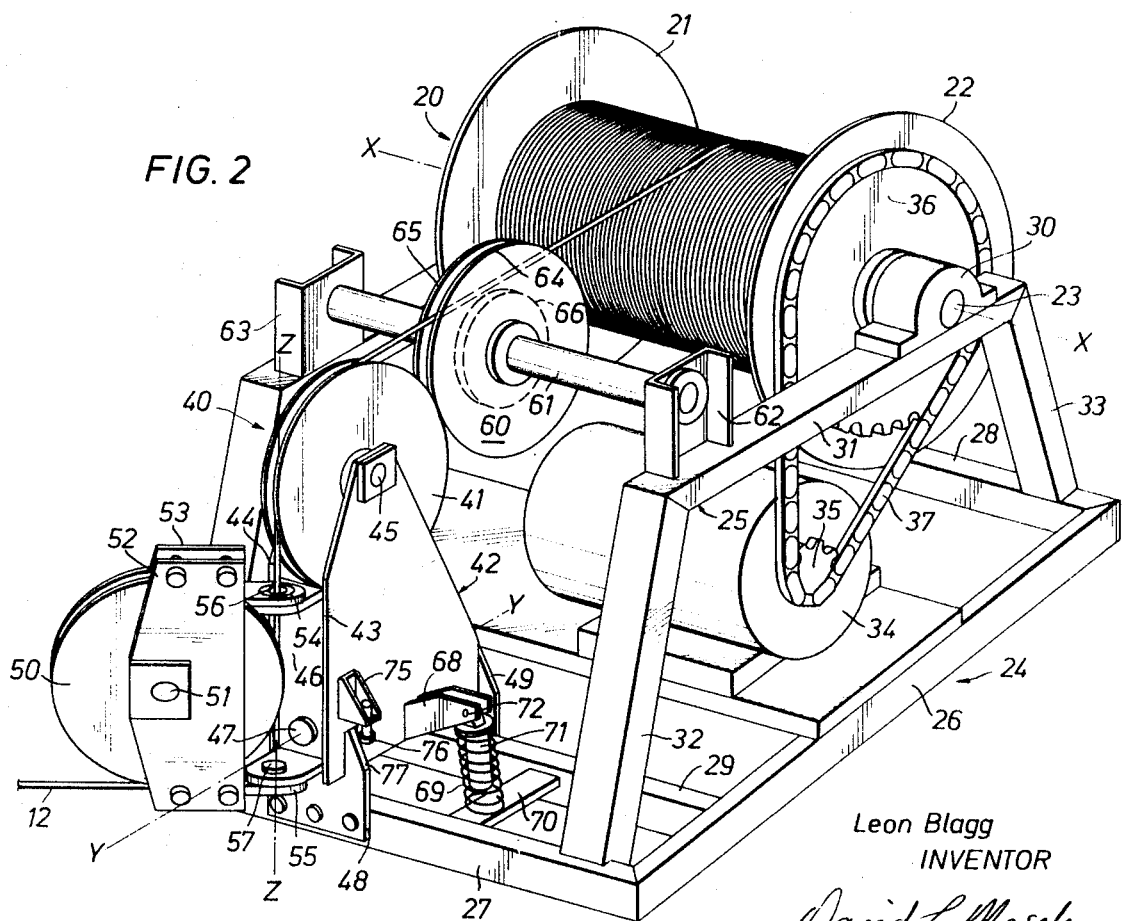
FIG. 2 is an isometric view of the winch unit of the present invention.

Turning now to FIG. 2, a winch unit in accordance with the principles of the present invention is illustrated as including a drum 20 having a central core around which the cable 12 is wound between end flanges 21 and 22. The drum 20 is mounted on a shaft 23 for rotation about a horizontal axis X-X, and is supported on a base or platform 24 by side frames 25. The base and side frames can be constructed in any suitable manner, such as, for example, by angle iron and U-beams which are welded or otherwise secured together. The base 24 can have side member 26 and front and rear members 27 and 28 as well as an intermediate transverse member 29. The spool shaft 23 can be journaled in bearing assemblies 30 attached to side frame member 31 which are supported by front and rear legs 32 and 33. The drum 20 can be driven in either direction by a suitable motor 34 mounted on the base 24, the motor being coupled to the spool by driving and driven sprockets 35 and 36 and a conventional chain 37. Of course, the motor 34 can run at various speeds, and can be coupled to the driving sprocket 35 through a conventional gearbox (not shown) providing differing drive ratios.

A cable guide assembly 40 is mounted on the base 24 in front of the drum 20 and routes the cable 12 to the drum. This assembly includes an upper sheave 41 which is mounted by a support structure 42 for oscillating rotational motion about an axis Y–Y, the axis Y–Y being located centrally of the drum flanges 21 and 22 and extending perpendicularly to a vertical plane containing the axis X–X of the drum 20. The support structure 42 may be constituted by side plates 43 and 44 which receive the sheave shaft 45, and transverse plates 46 (only the front plate shown) which receive a pivot shaft 47. The pivot shaft 47 is journaled in front and rear support plates 48 and 49 which are bolted or otherwise secured respectively to the front and transverse base members 27 and 29. The guide assembly 40 further includes a lower sheave 50 which is pivotally mounted on the support structure 42 about a pivot axis Z–Z. The cable 12 is routed underneath the lower sheave 50 and over the upper sheave 41 to the drum 20 in such a manner that the cable between the sheaves 50 and 41 passes along the axis Z–Z. The shaft 51 is mounted between support plates 52 and 53 which are pivotally connected to the support structure 42 by flanges 54 and 55 and pins 56 and 57, the respective plates and flanges having coincident holes through which the cable can pass. It will be noted that the lower sheave 50 can rotate not only about its own axis 51, but also in a horizontal plane about the axis Z–Z, this later articulation enabling a wide range of departure angles for the cable so that accurate alignment of the winch unit 15 with respect to the borehole 11 is unnecessary.

A compensating sheave 60 is freely rotatable and slidable along a shaft 61 extending parallel to the spool axis X–X and is mounted at its ends by brackets 62 and 63 on the frame members 31. The sheave 60 can have side flanges 64 and 65 which are spaced apart, and a core 66 (illustrated in phantom lines) which is appropriately sized to compensate for changes in cable levels between full and empty drums. As will appear more fully hereafter, the function of the sheave 60 is to maintain correct geometry as the cable level changes, and in a preferred arrangement, the diameter of the core 66 may be such that the cable path between the upper sheave 41 and the core 66 is approximately horizontal when the upper sheave 60 is at either extreme of its traverse during spooling.

The cable guide assembly 40 oscillates from side to side about the axis Y–Y due to the lateral pressure exerted by the cable 12 within the running groove of the upper sheave 41 as the cable traverses the drum 20 during winding. In order that the guide sheave 41 will closely follow the lateral position of the cable 12 when the cable tension is low, the guide assembly 40 can be counterbalanced. For example, as shown in FIG. 2, an arm 68 can extend outwardly from each support plate 43 (only the near side arm shown) and a compressible coil spring 69 can be positioned between the outer end of each arm 68 and a base member 70. Each spring 69 may be internally supported by a rod 71 to prevent collapse, each rod being attached to the outer end of a respective arm 68 by a pin 72. As the guide assembly 40 is caused to pivot to either side of center due to cable tension, the springs 69 yieldably resist pivotal movement with a moment which is approximately equal to the moment, taken about the axis Y–Y, due to the vertical component of the weight of the assembly. Accordingly, only a very small lateral pressure of the cable 12 against the sides of the running groove in the guide sheave 41 is needed to cause the sheave to follow the lateral position of the cable as it is wound onto, and off of, the drum 20. Moreover, the reaction force of the springs 69 can be adjusted to compensate for the off-center or nonsymmetric weight of the lower sheave 50 at various departure angles.

In further accordance with the present invention, adjustable stops are provided to limit the amplitude of pivotal rotation of the guide assembly 40 as the cable 12 reaches either side flange in order to precisely control the minimum fleet angle of the cable 12 and to confine it to a favorable magnitude. As shown in FIG. 2, suitable structure for accomplishing this purpose can include a side bracket 75 attached to each mounting plate 43 or 44 (only the near side shown), each side bracket receiving a threaded bolt 76 or the like. Each bolt 76 is adjustable vertically by simply turning it, and the head of each bolt is positioned to engage a surface 77 on the base 24 when the assembly has pivoted sufficiently to either side, at which point the bolts provide stop limits against further angular movement of the assembly.

OPERATION

In operation, the winch unit as shown in the drawings is adapted to pay out the cable 12 in order to lower the sonde 10 into the well bore 11, and to take in the cable in order to withdraw the sonde from the well bore so that a logging operation can be conducted while coming out. The cable 12 is routed from the sheave wheel 13′ underneath the lower sheave 12 and over the upper sheave 41, and is, or course, under tension.

The manner in which the fleet angle of the cable 16 is established is best explained with reference to FIGS. 3—5. Referring initially to FIG. 3, it should be noted that due to the arrangement of pivot axes, the cable 12 is constrained to pass through point D which always lies in a horizontal plane containing the pivot axis Y–Y, regardless of the departure angle of the cable. Point A indicates the uppermost point of contact between the cable 12 and the sheave 41, point; point B is the contact point, if any, between the cable 12 and the core 66 of the sheave 60; point C is the first point of contact between the cable and the drum 20, the spooling point. Fundamentally, it must be appreciated that tension force in the cable 12 causes the points A, B and C to lie in the same plane as the axis Y–Y, this plane also containing the axis Z–Z. Thus, all forces on the system due to cable tension lie in this plane and pass through the axis Y–Y, which is the pivot axis. A line containing the points A, B AND C will correctly define the path along which the cable 12 approaches the drum 20. When this line or path is viewed from the top as in FIG. 4, the angle between the path and a plane parallel to the end flanges 21 or 22 which also passes through the spooling point will define the fleet angle $\theta$. For the dead center position of the guide assembly 40 relative to the drum 20, the A–B–C line lies within the reference plane and the fleet angle is zero. However, when the sheave 41 has pivoted to either side of center, the fleet angle is established by the relative elevations of the points A, B, and C, and the fleet angle can be changed by varying the relative elevations or heights of these points. For example, with sheave 41 off-center, if point A were lowered toward the axis Y–Y (pivot radius R made shorter), the fleet angle would be increased in a positive sense; conversely, if the point A is raised (pivot radius R made longer), the fleet angle would become increasingly negative. Consequently, for any off-center pivotal location of sheave 41, the fleet angle could be adjusted to zero by changing the pivot radius R. Moreover, assuming that the relative elevations of the points A and C are such that a zero fleet angle is established when the spooling point is at either flange 21 or 22, an increase in the elevation of point B (the sheave 60 cannot pivot) would cause the sheave 41 to pivot toward center and point B to shift toward center as the cable tension maintains the planar relationship of the points. Accordingly, a positive going fleet angle would be established.

The foregoing discussion is given to enable an understanding of the principles involved. In a preferred embodiment, the geometry is arranged such that the elevation of point A, when the drum 20 is full of cable 12 and the spooling point is at or near either side flange 21 or 22, is the same as the elevation of C, a condition which tends to establish a zero fleet angle at the flanges. It should be noted that in this case, the cable 12 does not actually touch the core 66 of the compensating sheave 60. The pivot-limit structures including the bolts 76 are set, however, so that a positive fleet angle of about 1¼° is established when the spooling point reaches either side flange, the point at which the cable reverses spooling directions. It has been found that a fleet angle of this magnitude will insure proper reverse spooling action.

As the layer diameter of the cable 12 on the drum 20 changes, resulting in a change in elevation for the point C as shown in FIG. 3, the fleet angle would be changed somewhat over a small range. However, an intermediate point of elevation C will occur wherein the cable touches the core 66 of the compensating sheave 60, so that a fixed elevation for point B is established. Then as the cable layer diameter changes between $C_1$ and $C_2$, the effect is to minimize fleet angle change, because, relatively speaking, the point B is being raised with respect to point $C_1$, providing a compensating effect to offset for fleet angle change which would otherwise occur due to decrease in elevation of the spooling point from $C_1$ to $C_2$. Thus, it will be appreciated that once the cable 12 actually touches the core 66 at point B, the fleet angle will remain essentially constant from cable levels $C_1$ to $C_2$, the fleet angle being established by the pivoting sheave 41 and the compensating sheave 60.

To further illustrate the manner in which the fleet angle is established, in FIG. 4 three positions of the spooling point on the drum 20 are shown, one at the flange 21, one at dead center, and one in-between center and the flange 22. A line containing the points A, B and C will define the path along which the cable 12 approaches the spooling point on the drum 20 and the fleet angle. At the dead center position, the fleet angle is, as previously described, zero. At the flange 21, it will be recalled that the elevations of A and C in a preferred embodiment were made the same. Thus, when viewed from the front as in FIG. 5, the line containing A and C appears as a point, which projects in the top view FIG. 4 as a line parallel to the drum flanges and produces a zero fleet angle. Of course, the stop limit bolts 76 are set, however, to provide a minimum fleet angle of about 1¼°. For the intermediate position, two conditions are shown in FIG. 4, one condition with the drum 20 full of cable, and the other condition for a partially filled or an empty drum. For the full drum, intermediate position case, the cable 12 extends from A directly to C, and the cable is not touching at B. If point C in the side view is projected to the front view and then to the top view, these points then describe the line along which the cable 12 enters the drum 20 at fleet angle $\theta_f$. For the second case of a partially filled or empty drum, the line will go from C to B and then to $C_E$. Now the fleet angle $\theta$ is established by a projection of C—NB. It is apparent that the angle $\theta$ is slightly greater than angle $\theta_f$, however, from cable level $C_1$ down to $C_2$, the fleet angle will remain essentially constant, since it is established by the pivoting sheave 41 and the sliding sheave 60.

At slow cabling speeds, the adjustable stops 76 may not be needed, and the fleet angle can be established by the relative elevations of the points A and B. However, at higher cabling speeds, friction and inertia of the system may have adverse effects on the fleet angle, and the stop limits can be used together with a geometry which would otherwise provide a zero fleet angle, but for the friction and inertia effects.

As shown in FIG. 2, the diameter compensating sheave 60 preferably has its side flanges 64 and 65 spaced apart so that the cable 12 does not rub against both sides simultaneously. As an alternative, the sheave 60 could, of course, be replaced by an elongated roller which would function in the same manner. Also, adjustable stop chains (not shown) can be provided to prevent the sheaves from falling to one side when the cable is slack.

A new and improved apparatus for controlling the fleet angle of a cable being spooled onto a drum has been disclosed. The apparatus is particularly useful in connection with well logging operations where wellsite conditions require short hookups or poor lineups. Since certain changes or modifications may be made in the disclosed structure by persons of ordinary skill in the art without departing from the inventive concepts involved, it is the aim of the appended claims to cover all such changes and modifications falling within the true spirit and scope of the present invention.

I claim:

1. Apparatus for use in spooling cable on a drum having a rotation axis, comprising: first and second sheaves mounted for pivotal rotation about intersecting axes, at least one of which is transverse with respect to the drum and said rotation axis; and means for mounting said sheaves in such a manner that forces produced by cable tension pass through said one axis, whereby cable tension causes one of said sheaves and said one axis to lie in a common plane, the pivot radius of said one sheave with respect to said one axis determining the fleet angle of the cable with respect to the drum.

2. The apparatus of claim 1 wherein said mounting means includes pivot means for mounting said other sheave in a position tangent to a plane containing said one axis so that the cable tension is directed through a point on said one axis.

3. The apparatus of claim 1 further including compensating means located between said one sheave and the drum for compensating for the effects of changes in drum cable diameter on said fleet angle.

4. The apparatus of claim 1 further including stop means for limiting the extent of pivotal rotation of said one sheave in order to establish minimum fleet angles for the cable at the points where spooling directions are reversed.

5. The apparatus of claim 1 further including means for counterbalancing said sheaves and said mounting means with respect to said one axis in order to reduce the effects of friction and inertia on the fleet angle.

6. The apparatus of claim 4 further including means for counterbalancing said sheaves and said mounting means with respect to said one axis in order to reduce the effects of friction and inertia on the fleet angle.

7. Apparatus for use in providing a favorable fleet angle for a cable being spooled on a drum, said drum having end flanges and being rotatable about a first axis, comprising: a guide sheave mounted for pivotal rotation about a second axis extending perpendicular to a plane containing said first axis; a leader sheave mounted with respect to said guide sheave and said second axis in such a manner that forces on said sheaves due to the tension of a cable extending around said sheaves and to said drum pass through said second axis; and means for establishing an intermediate point of minimum elevation for the cable passing between said guide sheave and said drum, cable tension causing said guide sheave, said point and said second axis to lie in a common plane which defines, together with a plane parallel to one of said end flanges, the fleet angle of the cable with respect to said drum.

8. The apparatus of claim 7 further including means for pivotally mounting said leader sheave about an axis intersecting said second axis to enable various departure angles of cable.

9. The apparatus of claim 7 further including means for counterbalancing said guide and leader sheaves with respect to said second axis in order to compromise the effects of inertia on the fleet angle.

10. The apparatus of claim 7 further including means for limiting pivotal rotation of said guide sheave to precisely control the minimum fleet of the cable at either of said end flanges.

11. Apparatus for use in providing a favorable fleet angle for a cable being spooled on a drum, said drum having end flanges and being rotatable about a first axis, comprising: a first sheave mounted for pivotal rotation about a second axis extending perpendicular to a vertical plane containing said first axis; a second sheave for leading the cable through a point in a horizontal plane containing said second axis, the cable being routed around said second and first sheaves and to a spooling point on the drum; means for mounting said first sheave at a predetermined pivot radius with respect to said second axis, forces due to cable tension causing said first sheave, spooling point and second axis to lie in a common plane, the angle between the cable path in said common plane and a reference plane parallel to the drum flanges and extending through the spooling point defining the fleet angle; and means providing a minimum point of elevation for the cable path between said first sheave and the drum for compensating for fleet angle change due to changes in elevation of the spooling point between full and empty drums.

12. The apparatus of claim 11 wherein said compensating means is an element rotatable about an axis which is parallel to said first axis.

13. The apparatus of claim 11 further including pivot limit means cooperable with said mounting means for limiting the maximum angular displacement of said first sheave so that said first sheave remains between the flange planes of the drum to control the minimum fleet angle of the cable at the flanges.

14. The apparatus of claim 11 further including means for counterbalancing said sheaves and said mounting means to reduce the effects of inertia on said fleet angle.